United States Patent Office 3,280,220
Patented Oct. 18, 1966

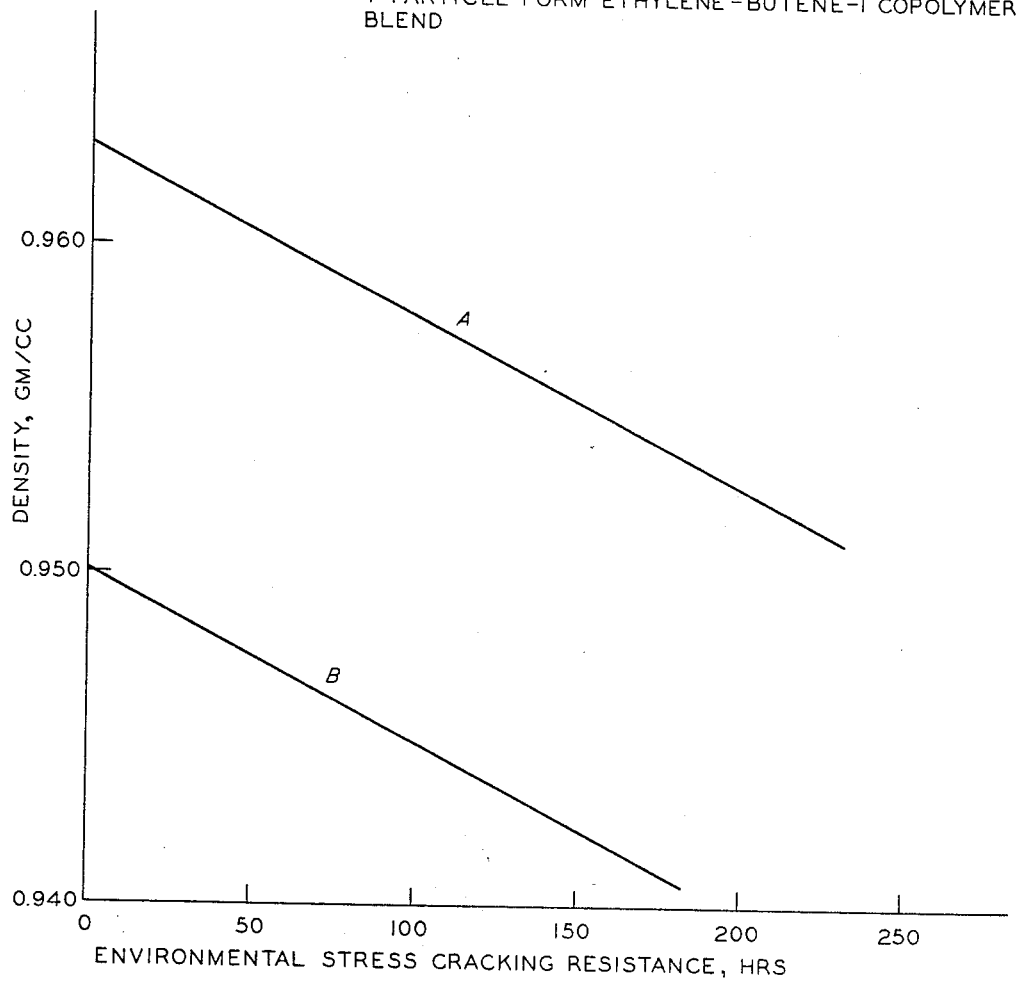

3,280,220
BLEND OF HIGH DENSITY POLYETHYLENE-1-BUTENE COPOLYMER
William M. Nelson, Bartlesville, Okla., assignor to Phillips Petroleum Company, a corporation of Delaware
Filed Apr. 29, 1963, Ser. No. 276,228
6 Claims. (Cl. 260—897)

This invention relates to an improved resinous composition of matter. In one aspect, it relates to an improved thermoplastic composition suitable for the blow-molding of bottles and the like. In another aspect, it relates to an improved polymer of ethylene composition suitable for the manufacture of filament, wire coatings and of plastic pipe, especially by extrusion.

The blow-molding of bottles from thermoplastic materials such as polymers of olefinic hydrocarbons is an established art. The use of such bottles as containers for liquid for household use, e.g. medicines and detergents, is advantageous, as compared with glass bottles, because plastic bottles are relatively light, easily disposable, and resistant to breakage. Corresponding advantages are realized in the use of thermoplastic pipe, as compared with metal pipe. Normally solid polymers of olefins, e.g. ethylene, are suitable materials for fabricating pipe and bottles.

In general, a thermoplastic material for use in forming pipe or bottles must have at least the following characteristics:

It must be sufficiently fluid in the molten state to be readily processable, i.e. extrudable and/or moldable, in equipment conventionally used for this purpose.

It must resist environmental stress cracking, in the presence of certain materials, such as detergents, for sufficient lengths of time to permit it to be used in the form of containers of such materials.

It must resist breakage by impact such as that produced when a bottle containing liquid detergent, or the like, is accidentally dropped to the floor.

The properties enumerated are correlatable with the molecular weight or the molecular weight distribution of the ethylene polymer in question. A polymer having a low molecular weight tends to be readily processable or formable, but also tends to have low resistance to mechanical impact or shock and to environmental stress cracking, which is the tendency of the polymer to become embrittled and crack on extended contact with certain liquids, such as certain household detergents. Conversely an ethylene polymer of high molecular weight tends to be resistant to impact and environmental stress cracking, but tends to resist flow, even when molten, and is consequently difficult to mold. It is thus seen that the enumerated requirements tend to be mutually exclusive.

My invention solves the problem outlined hereinbefore by providing a thermoplastic composition which is readily formable into monofilaments, bottles or pipe as may be employed as a wire coating material by the use of conventional equipment and technic.

An object of this invention is to provide an improved thermoplastic composition. Another object is to provide a composition readily formable into bottles by blow-molding. Another object is to provide a composition suitable for the manufacture of extruded pipe or tubing. Another object is to improve the processability of certain types of ethylene copolymers. Another object is to improve the resistance of certain types of ethylene homopolymers and copolymers toward impact and environmental stress cracking. Another object is to provide an improved material for use in the form of monofilament. Other objects and advantages will be apparent to those skilled in the art on reading this specification.

These objects are broadly accomplished by a novel composition comprising a blend of polymers of ethylene having a density of 0.934 to 0.966 gms./cc., a melt index of 0.1 to 1.0 and an ESC (environmental stress cracking resistance, ASTM D 1693–60T) of greater than 30 hours.

In one aspect of the invention the aforementioned blend of polymers of ethylene comprises a blend of (A) a polymer of ethylene having a density of 0.920 to 0.950 gm./cc., a high load melt index of 0.1 to 20 and an ESC of greater than 500, and (B) a polymer of ethylene having a density of at least 0.955 gm./cc., a melt index of 1.0 to 20 and an ESC less than 10.

Recent developments in the production of 1-olefin polymers have provided numerous useful and valuable resinous materials which have found wide acceptance in the plastics art. One well known process for the production of these polymers comprises polymerization of the monomer in the presence of certain catalyst systems, such as chromium oxide catalyst containing hexavalent chromium according to the procedure disclosed in U.S. Patent 2,825,721. These products include both homopolymers made from a single olefin monomer or copolymers made from 2 or more olefin monomers. These homopolymers and copolymers can be made at temperature levels at which the product is obtained as a solution in the reaction diluent or by operating at a suitable lower temperature they can be obtained as solid pulverulent products suspended therein.

The product obtained as a solution, herein referred to as solution polymer, is a highly crystalline resinous solid readily processable in standard equipment. Products obtained at lower polymerization temperatures, herein referred to as particle form polymers, have many of the properties of the solution polymers but are of considerably higher molecular weight, are more rigid and are less processable in standard equipment.

It has been found that copolymers of ethylene and higher olefins, such as butene-1, have a lower crystallinity, lower density and are less subject to environmental stress cracking than homopolymers of ethylene. For example, particle form copolymers of ethylene and butene-1 having a density of 0.945 gms./cc. have a very high environmental stress cracking resistance of at least 1000 hours (as measured by ASTM D–1693–60T), whereas a homopolymer of ethylene produced by the solution form process has a higher density but has an environmental stress cracking of about 1. It has been found that a blend of copolymers of ethylene-butene-1, one produced by the particle form process and the other produced by the solution form process provides a blend having quite desirable characteristics with regard to environmental stress cracking. As shown in the attached drawing, line B, the environmental stress cracking resistance for the copolymer-copolymer blend increases with a decrease in the density of the blend. From a study of curve B, it would be expected that if a substitution were made for the solution formed ethylene copolymer which has a relatively high ESC with a solution formed homopolymer having an environmental stress cracking of about 1, the environmental stress cracking resistance would be deterimentally affected. It has now been surprisingly discovered that a blend of solution formed ethylene homopolymer and particle formed ethylene-butene-1 copolymer provides higher environmental stress cracking resistance than similar blends of the copolymers as represented by Curve A in the drawing.

Stress cracking as used herein refers to an external or internal rupture in a plastic material caused by tensile stresses less than its short time mechanical strength. The development of such cracks are frequently accelerated by the environment to which the plastic is exposed. The stresses which cause cracking may be present internally or externally or it may be a combination of these stresses.

The appearance of a net work of fine cracks is called "crazing."

Environmental stress cracking (ESC) as employed herein refers to the procedure for determining stress cracking in an environment of soaps, wetting agents, oils, or detergents and organic substances which are not absorbed appreciably by the polymer as defined in ASTM D 1693–60T. This is also referred to herein as Bell ESC. The environment employed in this determination is Igepal CO–630 (Antarox A 400) obtained from General Dye Stuff Corp., New York, and is employed at full strength. Igepal is an alkyl-aryl polyethylene glycol.

The blend of this invention is a homogeneous mixture of two polymers of ethylene which for convenience can be referred to herein as component A and component B. The blend has a density in the range of 0.934 to 0.966, preferably 0.950 to 0.960, even more preferably 0.956 to 0.959 gm./cc.; a melt index of 0.1 to 1.0, preferably 0.30 to 0.80 and more preferably 0.45 to 0.65, and an ESC as determined by ASTM D 1693–60T of greater than 30 hours, preferably 30 to 500 hours, even more preferably greater than 60 hours or 60 to 200 hours. In addition, the blend has an increased flexural modulus, generally greater than 200,000 p.s.i. decreased CIL flow and a narrower molecular weight distribution than comparable blends of solution copolymer and particle form copolymer.

Preferably the bottle ESC (hereinafter described) of the blend with 10 per cent failure is at least 75 hours at 140° F., preferably 100 to 1000 hours, even more preferably a minimum of 168 hours with 33 percent Igepal/$H_2O$, and a 33 percent fill.

Component A is a polymer of ethylene having a density in the range of 0.920 to 0.950, preferably 0.930 to 0.950, more preferably 0.939 to 0.943 gm./cc.; a high load melt index of 0.1 to 20, preferably 0.5 to 10, even more preferably 1.0 to 3.0; and an ESC of greater than 500, preferably greater than 1000. Component A is present in the total composition in an amount in the range of 20 to 60, preferably 25 to 45, even more preferably 26 to 29 weight parts per 100 parts of blend of A and B. Preferably component A is a copolymer of ethylene with an alpha olefin having from 3 to 8 carbons per molecule, even more preferably a copolymer of ethylene and either butene-1 or propylene.

Component B is a polymer of ethylene, preferably a homopolymer of ethylene, having a density of at least 0.955, preferably at least 0.960, even more preferably 0.960 to 0.970 gm./cc.; and a melt index of 1.0 to 20, preferably 1.0 to 10, even more preferably 4.0 to 6.0 and an ESC of less than 10, generally about 1.0. Component B is present in the blend in an amount in the range of 80 to 40, preferably 75 to 55, even more preferably 74 to 71 weight parts per 100 weight parts of total blend of A and B.

Another suitable method for determining ESC which is not comparable in terms of absolute values with Bell ESC but which is indicative of the environmental stress cracking resistance is conventionally known as bottle ESC. In this test the bottle is filled with the liquid to 10 percent, 33 percent or 50 percent of total volume, closed and maintained at an elevated temperature (usually 140° F. or 150° F.) until a standard number of bottles exhibit failure due to stress cracking. Frequently used standards are 10 percent ($F_{10}$), and 50 percent ($F_{50}$). This procedure is more fully described in article entitled "How to Speed up Plastic Bottle Testing" by R. J. Martinovich and Robert Doyle, Package Engineering, April 1961, pages 66 to 74. The bottles used for performing the tests were blow-molded by the use of an injection-molding machine described by D. L. Peters and J. N. Scott, Society of Plastic Engineers Journal 16, 73 (1960). The molding occurred at a minimum stock temperature of approximately 350° F. and a minimum cycle time of 17 seconds. The weight of each bottle was regulated to be 23.0±0.5 grams. The pinch-off width of the bottle was controlled at 1.375 ±0.125 inches.

Blending can be accomplished by any of the polymer blending methods known in the art. For example, the two polymeric components can be intermixed as comminuted solids and blended in an intensive mixer which melts and mixes the polymers. Alternatively, the two polymers can be dissolved in a suitable solvent, for example, methylcyclohexane 2,2,4-trimethylpentane, any of the dodecanes, cyclohexane, toluene or any of the xylenes and the like, and recovered from solution by cooling and precipitating and/or by vaporizing the solvent.

The individual components of the blends, viz. Component A or Component B, can be prepared by any of the methods known in the art.

A suitable catalyst for synthesizing either component A or component B is a chromium oxide catalyst of the type described in Hogan and Banks, U.S. Patents 2,825,721 and 2,951,816.

Component A can be synthesized by copolymerizing ethylene with a higher 1-olefin, for example, 1-butene or propylene, in the presence of a suspension of the chromium oxide catalyst in a liquid inert diluent such as propane, normal pentane, normal hexane, cyclohexane, isopentane and isobutane at 100 to 225° F. so that the copolymer formed is a solid particulate non-aglutinative suspension in the reaction mixture. The olefin comonomer is usually propylene or 1-butene because they are usually most readily available. However, other olefins having 3–8 carbon atoms per molecule can be used as a comonomer, including 2-butene, 1-pentene, 1-hexene, 4-methyl-1-pentene, 1-heptene, 1-octene, 4-ethyl-1-hexene, and the like. The comonomer is normally present in a small percentage such as up to about 5 mol percent of the total monomer units in the monomer mixture. For example, ethylene-butane copolymers frequently contain about 1.5 to 3.0 percent butene monomer.

Component B can be synthesized in the same manner as component A with the polymerization temperature in the range of 240 to 310° F. so that the polymer forms as a solution thereof in the diluent. It is not, however, imperative that component B be a solution homopolymer, so long as the polymer of ethylene has the properties required hereinbefore.

Various additives such as antioxidants, pigments, and the like, can be added to the blends described herein without departing from the scope of this invention.

The properties which characterize the materials described in the specification and the claims hereof are determined as follows:

Melt index is determined by ASTM Method D 1238–57T. Condition E set forth in Table I of this ASTM Method is used for determining the melt index of the blends and of Component B. Condition F in said Table I is used for determining the melt index of Component A. The melt index measured under condition F is referred to herein as "high-load melt index."

The density referred to herein, is determined by ASTM Method D 1505–60T, with the exception that the sample is preconditioned as follows: The samples are prepared by compression molding pellets of the ethylene polymer to form a slab about 6 inches square and $\frac{1}{32}$ to $\frac{1}{2}$ inch thick. A Pasadena press (Model P–325, Pasadena Hydraulics, Inc.) is used. The slabs are molded at 20,000 p.s.i. and 330° F. The heat is then turned off. Tap water is circulated through the mold cooling system. The slab is cooled to 200° F. at the rate of 25° F. per minute, and then to 150° F. as rapidly as possible by increasing the flow rate of the cooling water. The slab is then removed from the mold and allowed to stand for 24 hours at room temperature. Small pieces of the slab, e.g. about ¼ inch cubes, are cut off for the density determination. These pieces are examined to be sure that they have no surface pits or other features which might occlude or entrap air when immersed in liquid. The density is then determined as prescribed in the ASTM method. Ethanol and water are used in the suspending liquids.

CIL flow is determined by the use of a rheometer developed by Canadian Industries, Ltd. (described more fully in J. Applied Physics 28, E. B. Bagley, May 1957), which is a capillary type machine capable of operating in the temperature range of 257 to 600° F. Pressures up to 2500 p.s.i. are supplied by a nitrogen cylinder. Unless otherwise specified, the data contained herein were taken at 500°F. and 1000 p.s.i. The capillary used had a diameter of 0.01925 inch and a length of 0.176 inch. In operation molten polymer is extruded through the capillary and the extrusion rate in grams per minute is determined. The reproducibility of extrusion rates is ±5 percent.

The invention is best illustrated by the following examples.

EXAMPLE I

A Banbury blend of a solution homopolymer of ethylene with a particle form copolymer of ethylene and butene-1 was prepared and evaluated for environmental stress cracking. A control was run using a blend of solution copolymer with particle form copolymer. The results of these tests are shown in Table I, and show a 365 percent improvement in ESC for the blend of the invention.

*Table I*

|  | Blend 1 | Blend 2 |
|---|---|---|
| Solution homopolymer (phr.) | 65 |  |
| Solution copolymer (phr.) |  | 65 |
| Particle form copolymer (phr.) | 35 | 35 |
| Density, gm./cc. | 0.957 | 0.947 |
| Melt Index | 0.32 | 0.34 |
| CIL [1] | 2.28 | 2.63 |
| Environmental Stress Cracking (hrs.) | 230 | 63 |

[1] Measured at 1,500 p.s.i. and 190° C.

EXAMPLE II

Four blends of particle form copolymers of ethylene and butene-1 and a solution homopolymer of ethylene having a melt index of 5.0 were evaluated and compared to a high density polymer of ethylene having a density of 0.960 gm./cc. and a melt index of 0.9. Density, melt index, CIL flow, flexural modulus and other properties were determined.

modulus is concerned, exhibits a much better Bell ESC and marked improvement in bottle ESC.

EXAMPLE III

Comparisons were made between a blend of the invention and a copolymer of ethylene and butene-1 prepared by both the solution process and the particle form process. The properties of the polymers are outlined in Table III.

*Table III*

COMPARISON OF THE PROPERTIES OF HIGH DENSITY DETERGENT GRADE RESINS

|  | Blend [1] | Solution Form Copolymer | Particle Form Copolymer |
|---|---|---|---|
| Density | 0.958 | 0.950 | 0.950 |
| Flexural Modulus | 200,000 | 170,000 | 160,000 |
| Vicat Softening, °F.[1] | 259 | 255 | 255 |
| Impact Strength, Ozod | 6 | 4 | 4 |

[1] 65 weight parts polyethylene and 35 weight parts of an ethylen butene-1 copolymer.

This data indicates that the blend has a higher flexural modulus, Vicat softening temperature and impact strength as compared to either the solution or the particle form polymer. The blend has a higher stiffness which means that the bottle weight can be reduced approximately 10 percent and still meet the same bottle stiffness characteristics of commercial resins. Approximately an 8 percent savings in bottle weight can be achieved by using the blend as compared to the solution polymer.

An additional advantage of the blend is the improved processability of the blend since it has a much higher flow response that comparable resins. This allows for a much lower minimum stock temperature in the blowing operation. Actual molding studies indicate at least a 10 percent reduction in cycle time, when molding the blend as compared to solution form copolymer. In addition to cycle studies the comparative evaluation of power requirement show a significant reduction in power consumption for blend, as compared to the solution form copolymer.

EXAMPLE IV

A comparison was made of the ESC of blends of a particle form copolymer of ethylene and butene-1 having a density of 0.945 gm./cc. and a high load melt index of 0.1 and solution form homopolymer of ethylene having a

*Table II*

COMPARISON OF THE PHYSICAL PROPERTIES OF PARTICLE FORM COPOLYMER-SOLUTION HOMOPOLYMER BLENDS

|  | A | B | C | D | High Density Polyethylene, Control |
|---|---|---|---|---|---|
| Composition, PF/Sol | 45/55 | 40/60 | 35/65 | 25/75 |  |
| Density, gm./cc. | 0.953 | 0.954 | 0.956 | 0.959 | 0.960 |
| Melt Index | 0.25 | 0.38 | 0.50 | 1.0 | 0.9 |
| CIL | 2.2 | 2.6 | 2.9 | 4.6 | 3.7 |
| ESC, Bell | 170 | 185 | 145 | 70 | 18 |
| Flexural Modulus [1] | 195,000 | 192,000 | 210,000 | 229,000 | 226,000 |
| Izod Impact [2] | 4.0 | 3.9 | 4.4 | 2.7 | 4.0 |
| Bottle ESC, 140° F.: |  |  |  |  |  |
| $F_{10}$ | 300 | 192 | 114 | 91 | 16 |
| $F_{50}$ | 200 | 300 | 300 | 200 | 16 |

[1] ASTM D-790-61.
[2] ASTM D-256-56.

It will be seen that in general density, melt index, CIL flow and flexural modulus increased with increasing solution homopolymer while impact, Bell and bottle ESC decreased. However, Blend D, although very similar to the control as far as density, melt index, CIL flow and flexural density of 0.960 gm./cc. and a melt index of 5.0 as illustrated in the following tables. A comparison was also made of the ESC of similar blends of said particle form copolymer and a solution form copolymer having a density of 0.95 gm./cc. and a melt index of 6.5.

Table IV
PARTICLE-FORM COPOLYMER—SOLUTION-FORM HOMOPOLYMER BLENDS

| Run No. | Weight percent - Particle Form copolymer | Weight percent - Solution Form homopolymer | Density, gm./cc. (ASTM D 1505-60T) | Melt index (ASTM D 1238-57T) | Environmental stress cracking, F$_{50}$ hr. (ASTM D 1693-60T) [1] |
|---|---|---|---|---|---|
| 1 | 35 | 65 | 0.957 | 0.19 | 115 |
| 2 | 28 | 72 | 0.959 | 0.29 | 64 |
| 3 | 20 | 80 | 0.961 | 0.56 | 40 |
| 4 | 21 | 79 | 0.961 | 0.64 | 32 |
| 5 | 14 | 86 | 0.963 | 2.6 | 1 |

[1] Conditioned 30 minutes instead of 1 hour at 100° C. before testing.

Table V
PARTICLE-FORM—SOLUTION-FORM COPOLYMER BLENDS

| Run No. | Weight percent - Particle Form copolymer | Weight percent - Solution Form homopolymer | Density, gm./cc. (ASTM D 1505-60T) | Melt index (ASTM D 1238-57T) | Environmental stress cracking, F$_{50}$ hr. (ASTM D 1693-60T) [1] |
|---|---|---|---|---|---|
| 6 | 35 | 65 | 0.947 | 0.17 | 88 |
| 7 | 28 | 72 | 0.948 | 0.63 | 20 |
| 8 | 20 | 80 | 0.949 | 0.67 | 14 |
| 9 | 14 | 86 | 0.949 | 1.5 | 10 |

See footnote 1 at bottom of Table IV.

The improvement in resistance to environmental stress cracking (ESC) is shown by taking the ratio of the ESC's for the blends of the invention (Runs 1–5) and the copolymer blends (Runs 6–9):

Table VI

| Runs: | ESC ratio |
|---|---|
| 1/6 | 1.31 |
| 2/7 | 3.20 |
| (Avg. of 3 and 4)/8 | 2.29 |
| 5/9 | 0.1 |

It is evident from the ratios shown in Table VI that the runs having compositions claimed in the invention have high relative values for ESC.

EXAMPLE V

The physical properties of various blends of solution homopolymers and particle form copolymers were compared to comparable blends of solution copolymers and particle form copolymers.

Table VII

|  | Density, gm./cc. | M.I. |
|---|---|---|
| Solution homopolymer | 0.960 | 5.0 |
| Solution copolymer | 0.950 | 6.5 |
| Particle form copolymer | 0.945 | 0.1 |

Blends of the invention have consistently higher flexural modulus than those of solution- and particle-form copolymers.

While certain examples, structures, composition and process steps have been described for purposes of illustration, the invention is not limited to these. Variation and modification within the scope of the disclosure and the claims can readily be effected by those skilled in the art.

I claim:

1. A blend consisting essentially of:
(A) 20–60 weight percent of a copolymer of ethylene and butene-1 having a density in the range of 0.920 to 0.950 grams per cc., a high load melt index of 0.1 to 20, and an ESC (ASTM D 1693-60T) greater than 500 hours and
(B) 40–80 weight percent of a homopolymer of ethylene having a density in the range of 0.955 to 0.970 grams per cc., a melt index of 1.0–20, and an ESC (ASTM D 1693-60T) less than 10, said resulting blend having a density in the range of 0.934 to 0.966 gram per cc., a melt index in the range of 0.1 to 1.0, and an ESC (ASTM D 1693-60T) greater than 60 hours.

2. A blend consisting essentially of:
(A) 25–45 weight parts of a copolymer of ethylene and butene-1 having a density in the range of 0.930 to 0.950 grams per cc., a high load melt index in the

Table VIII

| | Control | | | | Invention | | | |
|---|---|---|---|---|---|---|---|---|
| Run No | 1 | 2 | 3 | 4 | 5 | 6 | 7 | 8 |
| Solution copolymer | 86 | 79 | 72 | 76 | | | | |
| Solution homopolymer | | | | | 86 | 79 | 72 | 65 |
| Particle form copolymer | 14 | 21 | 28 | 35 | 14 | 21 | 28 | 35 |
| Flex Modulus, p.s.i.×10$^{-3}$* | 166 | 161 | 160 | 160 | 251 | 234 | 221 | 214 |

*ASTM D-790-61.

range of 0.5 to 10, and an ESC (ASTM D 1693–60T) greater than 1000 hours and (B) 75 to 55 weight parts of a homopolymer of ethylene having a density in the range of at least 0.960 grams per cc., a melt index in the range of 1.0 to 10.0 and an ESC (ASTM D 1693–60T) less than 10, said resulting blend having a density in the range of 0.950 to 0.960 grams per cc., a melt index in the range of 0.3 to 0.8, and an ESC from 60 to 500 hours.

3. A blend consisting essentially of:
(A) 26–29 weight parts of a copolymer of ethylene and butene-1 having a density in the range of 0.939 to 0.943 grams per cc., a high load melt index in the range of 1.0 to 3.0, and an ESC (ASTM D 1693–60T) greater than 1000 hours and
(B) 74 to 71 weight parts of a homopolymer of ethylene having a density in the range of 0.960 to 0.970 gram per cc., a melt index in the range of 4.0 to 6.0 and an ESC (ASTM D 1693–60T) of about 1, said resulting blend having a density of 0.956 to 0.959 grams per cc., a melt index in the range of 0.45 to 0.65, and an ESC of at least 60 hours.

4. An article of manufacture having at least one surface made from a blend consisting essentially of:
(A) 20–60 weight percent of a copolymer of ethylene and butene-1 having a density in the range of 0.920 to 0.950 grams per cc., a high load melt index in the range of 0.1 to 20, and an ESC (ASTM D 1693–60T) greater than 500 hours, and
(B) 40–80 weight percent of a homopolymer of ethylene having a density in the range of 0.955 to 0.970 grams per cc., a melt index in the range of 1.0 to 20, and an ESC (ASTM D 1693–60T) less than 10.

5. A bottle capable of holding liquid detergent whose walls are blow molded from a blend of
(A) 25 to 45 weight parts of a copolymer of ethylene and butene-1 having a density in the range of 0.930 to 0.950 gm./cc., a high load melt index in the range of 0.5 to 10 and an ESC (ASTM D 1693–60T) of greater than 500 hours, and
(B) 75 to 55 weight parts of a homopolymer of ethylene having a density of at least 0.960 gm./cc., a melt index in the range of 1.0 to 10.0 and an ESC (ASTM D 1693–60T) of less than 10 hours, said resulting blend having a density of 0.950 to 0.960 gm./cc., a melt index of 0.3 to 0.8 and an ESC of 60 to 500 hours.

6. A bottle capable of holding liquid detergents whose walls are blow molded from a blend comprising
(A) 26 to 29 weight parts of a copolymer of ethylene and butene-1 having a density in the range of 0.939 to 0.943 gm./cc., a high load melt index in the range of 1.0 to 3.0 and an ESC (ASTM D 1693–60T) of greater than 1000 hours, and
(B) 74 to 71 weight parts of a homopolymer of ethylene having a density in the range of 0.960 to 0.970 gm./cc., a melt index in the range of 4.0 to 6.0 and an ESC (ASTM D 1693–60T) of about 1, said resulting blend having a density of 0.956 to 0.959 gm./cc., a melt index of 0.45 to 0.65, and ESC of at least 60, and a flexural modulus of greater than 200,000 p.s.i.

References Cited by the Examiner

UNITED STATES PATENTS

| 3,086,958 | 4/1963 | Canterino et al. | 260—897 |
| 3,176,051 | 3/1965 | Gregorian et al. | 260—897 |
| 3,179,719 | 4/1965 | Cines | 260—897 |
| 3,179,720 | 4/1965 | Hillmer | 260—897 |
| 3,183,283 | 5/1965 | Reding | 260—897 |

FOREIGN PATENTS

| 641,321 | 5/1962 | Canada. |
| 1,240,852 | 8/1960 | France. |

MURRAY TILLMAN, *Primary Examiner.*

DONALD E. CZAJA, *Examiner.*

J. A. KOLASCH, E. B. WOODRUFF,
*Assistant Examiners.*